United States Patent [19]

Byrd et al.

[11] Patent Number: 4,781,172
[45] Date of Patent: Nov. 1, 1988

[54] VARIABLE FLOW MULTIPLE PASS APPARATUS FOR HEATING LIQUIDS

[76] Inventors: James H. Byrd, 32 Westover; Jimmy D. Ashley, Rte. 4, both of, Edenton, N.C. 27932

[21] Appl. No.: 804,047

[22] Filed: Dec. 3, 1985

[51] Int. Cl.⁴ .................. A47J 27/06; A47J 37/12; F28F 13/08
[52] U.S. Cl. .................... 126/378; 126/391; 99/403; 99/404; 165/145; 165/147
[58] Field of Search .............. 165/145, 147, 176; 126/378, 391; 99/403, 404

[56] References Cited

U.S. PATENT DOCUMENTS

| | | | |
|---|---|---|---|
| 158,433 | 1/1875 | Munzinger | 165/145 |
| 1,596,383 | 8/1926 | Weisgerber | 165/147 |
| 1,911,375 | 5/1933 | Lucke | 165/176 |
| 1,947,863 | 2/1934 | Mahoney | 165/145 |
| 1,989,340 | 1/1935 | Shepherd | 165/145 X |
| 2,069,409 | 2/1937 | Heenan | 165/145 X |
| 2,100,671 | 11/1937 | Reavell | 126/391 |
| 2,271,648 | 2/1942 | Kleist | 165/147 X |
| 2,662,850 | 12/1953 | Kraft | 165/145 X |
| 2,941,786 | 6/1960 | Kuljian et al. | 165/145 X |
| 2,947,522 | 8/1960 | Keller | 165/145 X |
| 3,134,430 | 5/1964 | Heyn | 165/145 |
| 3,289,755 | 12/1966 | Jacobs | 165/145 |
| 3,447,602 | 6/1969 | Dalin | 165/145 |
| 3,754,468 | 8/1973 | Wright et al. | 99/403 |
| 4,474,011 | 10/1984 | Nelson et al. | 165/147 X |
| 4,478,140 | 10/1984 | Bullock | 99/404 |
| 4,487,139 | 12/1984 | Warner | 165/145 X |
| 4,488,478 | 12/1984 | Leeper | 99/404 |
| 4,623,544 | 11/1986 | Highnote | 99/403 |

FOREIGN PATENT DOCUMENTS 1401030 10/1968 Fed. Rep. of Germany ..... 122/7 R

Primary Examiner—Albert W. Davis, Jr.
Assistant Examiner—John K. Ford
Attorney, Agent, or Firm—William J. Bundren

[57] ABSTRACT

The present invention is a variable flow, multiple pass heat exchanger for use in heating various liquids to include cooking oils. The apparatus is comprised of metallic tubing disposed in a baffled stacked configuration disposed within a combustion chamber or other heating element. The tubular configuration is disposed so as to permit the passage of fluid back and forth across the heating element in an upwardly direction and then to repeat this movement in a downwardly direction through a second tubular configuration. The device is capable of being constructed to permit as many passages as are necessary to achieve the desired result. Flow is controlled by varying the number of the tubular members between sucessive tube layers.

4 Claims, 2 Drawing Sheets

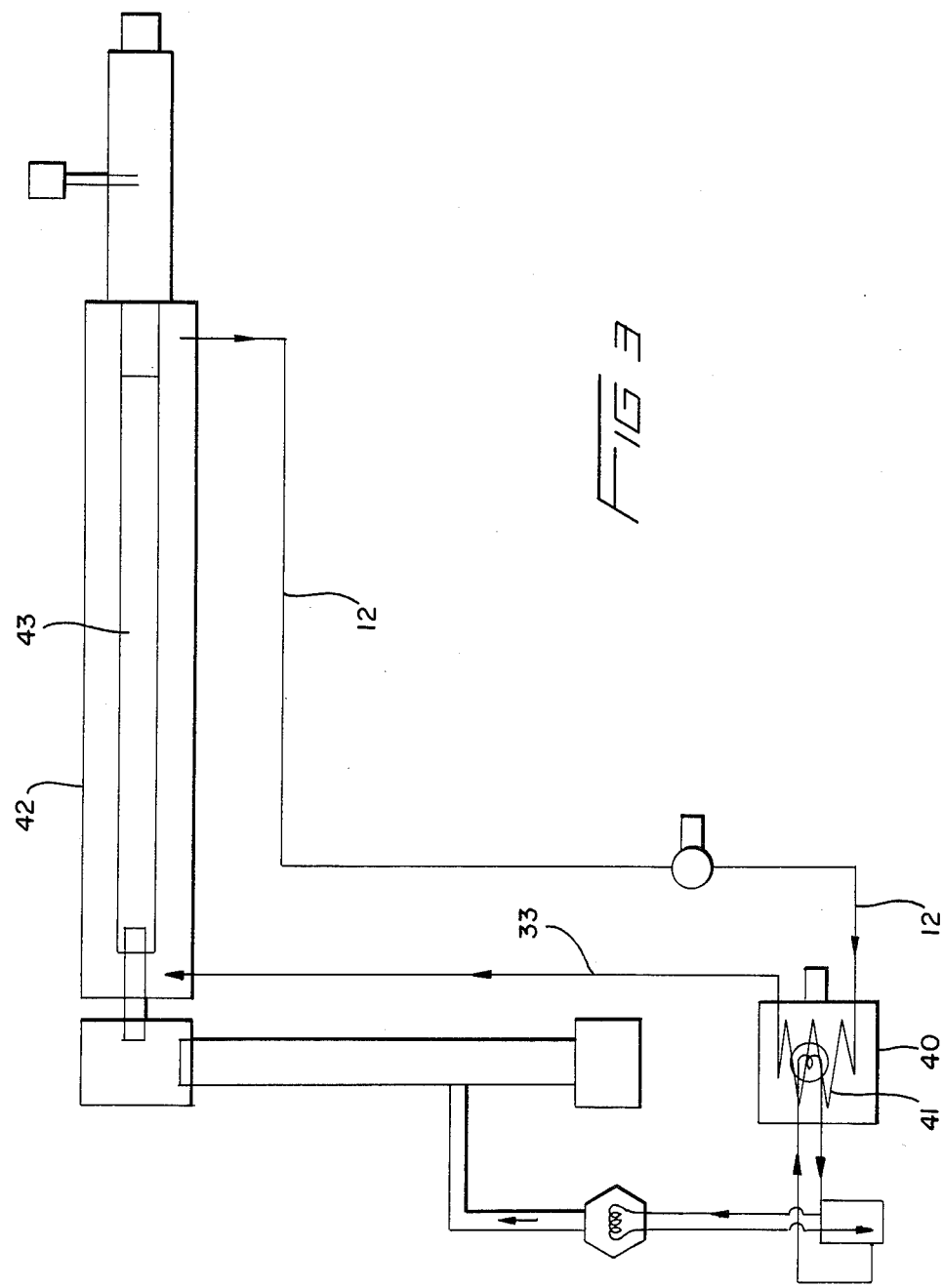

VARIABLE FLOW MULTIPLE PASS APPARATUS FOR HEATING LIQUIDS

BACKGROUND

The variable flow multiple pass apparatus for heating liquids of the present invention represents an advance over the prior art devices for heating large quantities of liquids such as cooking oil for use in the preparation of food products. The heating of the fluid bath in the food preparation process is currently carried out by direct flame impingement on the bottom of the conveyor trough. It is well known that this method of direct heating results in several disadvantages. Localized application of heat cannot provide a consistent temperature throughout the oil bath;, causing "hot spots" which result in oil degradation. Another disadvantage associated with such devices and methods is thermal inefficiency which results in higher energy costs. The device of the present invention overcomes these and other disadvantages by providing a variable flow multiple pass apparatus which is contained and separated from a cooking conveyor. The device provides for uniform and consistent temperature throughout the process and does so with greatly increased thermal efficiency.

SUMMARY OF THE INVENTION

The variable flow multiple pass apparatus of the present invention comprises a series of tubular members disposed in a baffled and stacked configuration through which is directed a flow of fluid. The apparatus is constructed of metallic tubular members and in its preferred embodiment, wherein the apparatus is applied to the heating of cooking oil, it overcomes problems associated with localized heating. This is accomplished through the elimination of "hot spots" associated with the localized application of heat, thus reducing or eliminating oil degradation. In addition, these improvements are accomplished with improved energy efficiency resulting in overall cost savings.

The device, in essence, is a heat exchanger, which, in its preferred embodiment, is disposed within a cyclone combustion chamber. Fluid is directed through a supply line and into a manifold that directs the liquid into one or more tubular members of the apparatus. The volume of the tubular member(s) is approximately equal to the volume of the supply line. The fluid is then directed through this first layer of tubular member(s) across the combustion chamber and into a second manifold where the liquid rises and is directed into a second layer of tubular sections which carry the liquid back across the combustion chamber. This second layer of tubular sections has a volume greater than that of the first layer; this variation in volume alters the flow rate of the fluid. The process is repeated upwardly to a final manifold through which the liquid is directed into a crossover passage and is then directed into a second stack of tubular layers. The liquid enters a manifold of the second stack and enters another set of tubular layers as it is directed back and forth through the combustion chamber in a downward, counterflow direction. This process is continued for as long as necessary to meet the end use demands of the heated liquid. Each consecutive layer of tubing is offset one from the other in a staggered configuration for more efficient heat distribution. The flow rate of the liquid is controlled by variations in the volume of the tubing.

DESCRIPTION OF THE FIGURES

FIG. 3 is a top view of the variable flow multiple pass apparatus for heating liquids as used for heating cooking oil in a process for cooking peanuts.

SPECIFIC DESCRIPTION OF THE INVENTION

The variable flow multiple pass apparatus for heating liquids of the present invention permits the heating of liquids through the use of a series of tubular members exposed to a conduction, convection, or radiation heat source, through which a liquid is directed.

Figure 1:
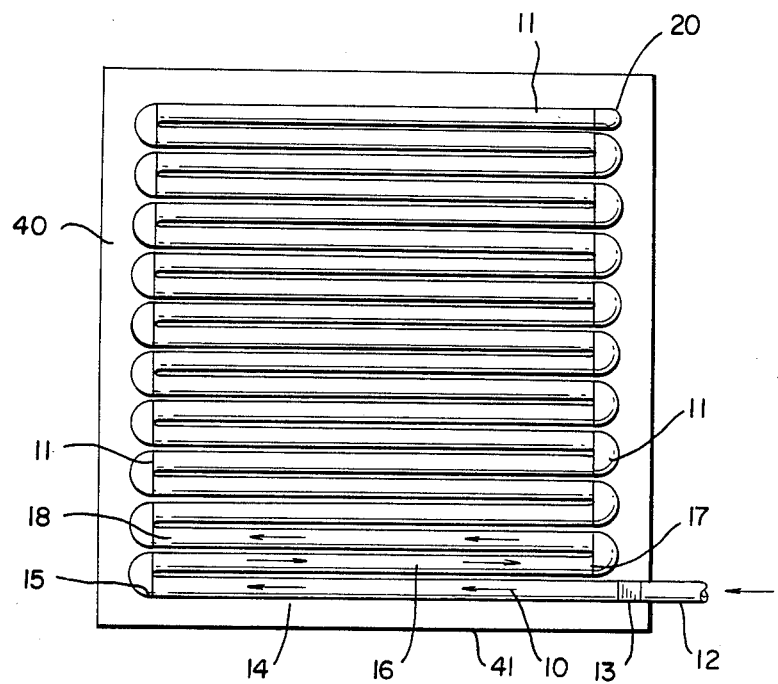
FIG. 1 is a cross sectional side view of the variable flow multiple pass apparatus for heating liquids.
Figure 2:
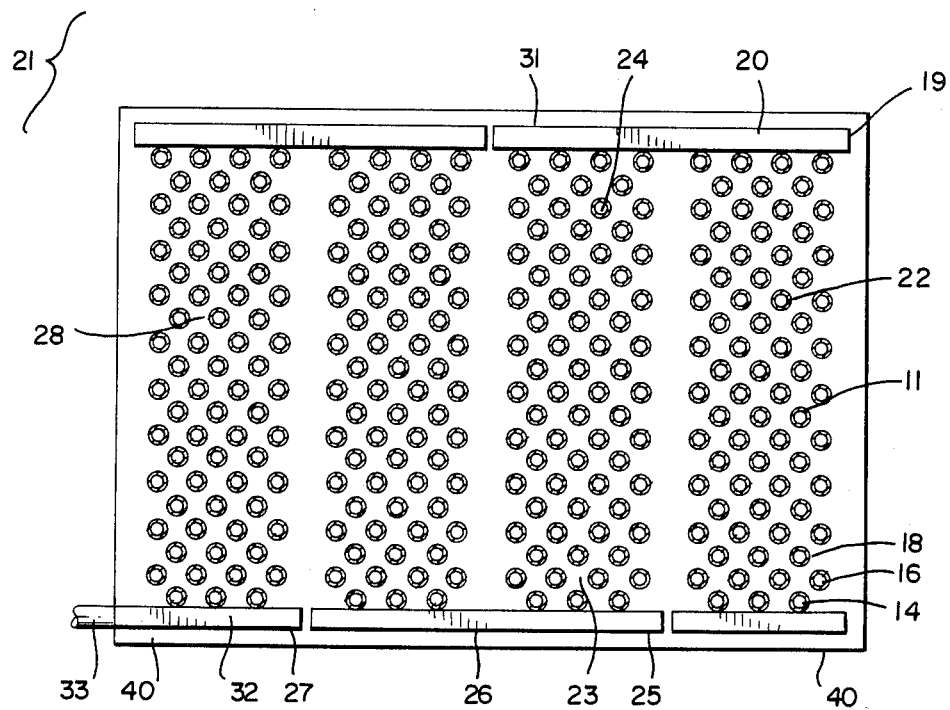
FIG. 2 is a cross sectional end view of the variable flow multiple pass apparatus for heating liquids.

As can be seen by referring to FIG. 1, the device of the present invention is comprised of a series of tubular members 11. Fluid 10 is directed from a supply line 12 and into a manifold 13 that directs the liquid into one or more tubes 14 across a combustion chamber 40. The volume of the first set of tubes 14 is approximately equal to that of a supply line 12 from which fluid is introduced into the device. After crossing the combustion chamber 40, the fluid enters a second manifold 15 wherein the fluid 10 is directed up and into a tube or tubes 16 whose volume or combined volume is greater than that of the first layer of tube(s) 14 or the supply line 12. The second layer of tube(s) 16 is offset by approximately 45 degrees from the tubes directly beneath them. This "staggered effect," as can be better seen by referring to FIG. 2, provides maximum uniform exposure to a heat source, which in the preferred embodiment is a cyclone combustion chamber. This is accomplished by allowing the heated gases to cascade upwardly and around each tubular member 11. In this way, hot combustion gas passes over said tubular members 11 at approximately right angles to said tubes, contributing to greater thermal efficiency.

Returning to FIG. 1, after passing back across the chamber 40, within the second layer of tube(s) 16, the fluid then enters a third manifold 17 which directs the fluid upwardly and into a third layer of tube(s) 18. These tube(s) 18 have a volume or combined volume roughly equal to that of the first layer of tubes 14 and the supply line 12. This process is repeated upwardly, alternating the volume of the tubes until the liquid reaches a final manifold 19 from which the liquid is directed into a formed channel or crossover section 20 through which the liquid is directed to a second stack of tubular layers.

FIG. 2 shows a series of stacks 21. After completing its flow upwardly through stack 22, the fluid enters a final manifold 19 and into a passover section 20. The liquid then passes to the second stack 23, where the liquid is directed into a manifold 31 and into and through a layer of tubes 24 as it begins its counterflow. The liquid passes across and downwardly through layers of tubes with alternating volume as in the first stack 22. The manipulation of volume controls the velocity of the flow of the liquid 10. Upon entering the bottom manifold 25 of stack 23, the liquid is directed into a second crossover section 26 from which the liquid is directed into entry manifold 27 of a third stack 28, where it begins its upward passage in the same manner as in the first stack 22. This multiple pass operation can be repeated as many times as is necessary; the number of passes depends on the end use of the heater. After completing the heating process, the cooking oil, or whatever liquid is being heated, passes through a final manifold 32 and into an exit line 33 wherein the heated liquid leaves the combustion chamber 40 and is directed to the cooking chamber.

The number of stacks, the number of layers, and the number of tubes have been described above for the preferred embodiment. Engineering changes may be made in all these numbers without significantly changing the invention. For example, for large scale production, a large heat exchanger may include eight or more stacks, 40 or more layers, and 8 or more tubes. The embodiment described above pertains to the multipass variable flow heat exchanger used in a peanut cooking apparatus at a rate of 200 lbs of peanuts per hour.

In its preferred embodiment, the tubes are constructed of stainless steel. The use of stainless steel complies with the standards established by the Food and Drug Administration. Although any metal may be used in this heat exchanger, the preferred metals are stainless steel, copper, or carbon steel. To overcome the poor thermoconductivity of stainless steel, a thin wall tubing is used. In its preferred embodiment, tubing of ½" OD×7/16 ID is used for best ratio of heating area to volume of fluid. It would be obvious to one skilled in the art that the preferred diameter may be altered to increase or decrease the flow volume. The device achieves a thermal efficiency of greater than 75%. Furthermore, the tubes do not need to be round tubing—square or rectangular tubing may also be used, as well as flattened species of each of these configurations. The velocity of oil in the tube subjected to flame exceeds 10 ft/sec.

FIG. 3 shows the device as disposed within a closed system requiring the continuous circulation of cooking oil. The variable flow multiple pass apparatus is disposed within a cyclone heating chamber 40 which, in this embodiment, is fired with L.P. gas. The cooking oil enters the device from a supply line 12 and crisscrosses the apparatus 41 receiving heat from the heating chamber 40. After reaching the desired temperature, the hot oil exits the heating chamber 40 through an exit line 33 where it is directed through said line 33 to a conveyor trough 42 through which peanuts or other applicable foodstuff are conveyed 43 in an oil bath. Oil is continuously circulated through the cooking trough 42 and exits same through the supply line 12 where it is returned to the heating chamber 40. Velocity of oil in the tubes within the heating chamber exceeds 10 ft/sec., thus reducing "hot spots" and oil degradation in the process. The hot oil is kept within 10° F. of the oil in the cooking trough.

Used within such a process, the variable flow multiple pass apparatus for heating liquids has the advantage of heating oil in a device separate from the cooking trough.

In tests performed to measure the efficiency of this device as directed toward the preparation of peanuts immersed in cooking oil, the following was achieved:

Cooking oil was passed through the heat exchanger of the present invention for a test period of 103.46 minutes with a burner nozzle capacity of 95,000 Btu per hour with propane and a burner nozzle operation time of 61.44 minutes. With the temperature of cooking oil maintained at 330° F., 56,416 Btus were consumed per hour on a production rate of 200 lbs of peanuts per hour, resulting in an energy consumption of 282 Btus per pound. The calculated thermal efficiency was 76.7% on a heat exchange surface area of 17.18 ft$^2$.

We claim:

1. In a cooking oil heat heater having a variable flow multiple pass heat exchanger for heating the cooking oil comprising a series of tubular members in a stacked configuration locted above a source of combustion gases wherein the cooking oil is directed through a supply line and into a manifold that further directs the cooking oil through a least one first layer of tubes, said tubes leading to a second manifold through which the cooking oil is directed upward and through a least one second layer of tubes having tubes of substantially the same diameter as the tubes in said first layer and having a greater number of tubes than said first layer, and wherein said layers of tubes are closely spaced and said tubes in each layer are staggered between said tubes of the next adjacent layer.

2. The cooking oil heater of claim 1 wherein a stack is formed comprising alternating first layers of tubes and second layers of tubes, each layer being connected by a manifold.

3. The apparatus of claim 2 wherein said stack is connected horizontally to at least one other stack by means of a manifold.

4. The cooking oil heater of claim 7 wherein said layers are configured to form a stack of alternating first and second layers, and wherein said stack is horizontally connected by manifold means to at least one other stack.

* * * * *